United States Patent
Reese et al.

(10) Patent No.: US 9,823,080 B2
(45) Date of Patent: Nov. 21, 2017

(54) METHOD, SYSTEM, AND COMPUTER PROGRAM PRODUCT FOR PROVIDING A FACILITY MAP

(75) Inventors: Kevin Reese, Fayetteville, GA (US); Kevin Fears, Atlanta, GA (US); Alfonso Jones, Suwanee, GA (US); Steven McDonald, Locust Grove, GA (US); Marty Turner, McDonough, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 310 days.

(21) Appl. No.: 13/334,980

(22) Filed: Dec. 22, 2011

(65) Prior Publication Data
US 2013/0166339 A1 Jun. 27, 2013

(51) Int. Cl.
*G06Q 10/00* (2012.01)
*G01C 21/32* (2006.01)
*G06Q 10/06* (2012.01)

(52) U.S. Cl.
CPC .............. *G01C 21/32* (2013.01); *G06Q 10/06* (2013.01)

(58) Field of Classification Search
CPC ...................................................... G06Q 10/06
USPC ........................................................ 705/7.13
See application file for complete search history.

(56) References Cited

U.S. PATENT DOCUMENTS

| | | | | |
|---|---|---|---|---|
| 5,857,199 A | * | 1/1999 | Tamano | G06F 17/30241 707/797 |
| 5,867,110 A | * | 2/1999 | Naito et al. | 340/286.05 |
| 5,960,337 A | * | 9/1999 | Brewster et al. | 455/404.2 |
| 6,421,725 B1 | * | 7/2002 | Vermilyea et al. | 709/224 |
| 6,708,108 B2 | * | 3/2004 | Jones | G01C 21/362 340/995.19 |
| 7,210,119 B2 | * | 4/2007 | Pothos et al. | 717/102 |
| 7,216,145 B2 | * | 5/2007 | Collings, III | 709/206 |
| 7,263,375 B2 | * | 8/2007 | Zavada et al. | 455/456.6 |
| 7,277,018 B2 | * | 10/2007 | Reyes et al. | 340/573.1 |
| 7,308,356 B2 | * | 12/2007 | Melaku et al. | 701/533 |
| 7,591,413 B1 | * | 9/2009 | Block et al. | 235/379 |
| 7,624,024 B2 | * | 11/2009 | Levis et al. | 705/1.1 |
| 8,401,514 B2 | * | 3/2013 | Ebdon et al. | 455/404.1 |
| 8,527,340 B2 | * | 9/2013 | Fisher et al. | 705/14.4 |
| 8,538,687 B2 | * | 9/2013 | Plocher et al. | 701/434 |
| 8,688,375 B2 | * | 4/2014 | Funk et al. | 701/495 |
| 8,880,103 B2 | * | 11/2014 | Gupta et al. | 455/456.5 |
| 2002/0089434 A1 | * | 7/2002 | Ghazarian | 340/988 |
| 2005/0006109 A1 | * | 1/2005 | McSheffrey et al. | 169/75 |
| 2006/0111089 A1 | * | 5/2006 | Winter et al. | 455/414.1 |
| 2007/0124064 A1 | * | 5/2007 | Fukui et al. | 701/208 |

(Continued)

OTHER PUBLICATIONS

SmartNAVIGATE, Agilis Systems, www.agilissystems.com (copyright 2009).

*Primary Examiner* — Alan S Miller
*Assistant Examiner* — Folashade Anderson
(74) *Attorney, Agent, or Firm* — Hartman & Citrin LLC

(57) ABSTRACT

A map of a facility is provided. Dispatch instructions for dispatching a mobile device from a starting location to the facility at a destination within a geographical area are received, and a current location of the mobile device is detected as the mobile device moves from the starting location towards the destination. The map of the facility is received based on the dispatch instructions and the current location of the mobile device, and the map of the facility is provided.

18 Claims, 4 Drawing Sheets

(56) References Cited

U.S. PATENT DOCUMENTS

| | | |
|---|---|---|
| 2007/0197261 A1* | 8/2007 | Humbel .................. 455/558 |
| 2008/0100436 A1* | 5/2008 | Banting et al. .......... 340/539.22 |
| 2008/0186166 A1 | 8/2008 | Zhou et al. |
| 2008/0250751 A1* | 10/2008 | Pavan et al. ............... 52/745.05 |
| 2008/0271052 A1* | 10/2008 | Nogge et al. ............. 719/317 |
| 2009/0049057 A1* | 2/2009 | Ghani ....................... 707/10 |
| 2009/0138353 A1* | 5/2009 | Mendelson ............... 705/14 |
| 2009/0203352 A1* | 8/2009 | Fordon et al. ............ 455/406 |
| 2009/0203387 A1* | 8/2009 | Wold et al. ............... 455/456.3 |
| 2009/0216438 A1* | 8/2009 | Shafer ...................... 701/210 |
| 2010/0010706 A1 | 1/2010 | Gormley |
| 2010/0188011 A1 | 7/2010 | Nielsen et al. |
| 2010/0188088 A1 | 7/2010 | Nielsen et al. |
| 2011/0028160 A1* | 2/2011 | Roeding et al. ........... 455/456.1 |
| 2012/0233046 A1* | 9/2012 | Joyce, Jr. ............. G06Q 10/087 705/35 |
| 2013/0069802 A1* | 3/2013 | Foghel et al. ............. 340/989 |
| 2013/0158867 A1* | 6/2013 | Sidhu ..................... G01S 19/34 701/472 |
| 2014/0335897 A1* | 11/2014 | Clem .................... G08G 1/0112 455/456.3 |

* cited by examiner

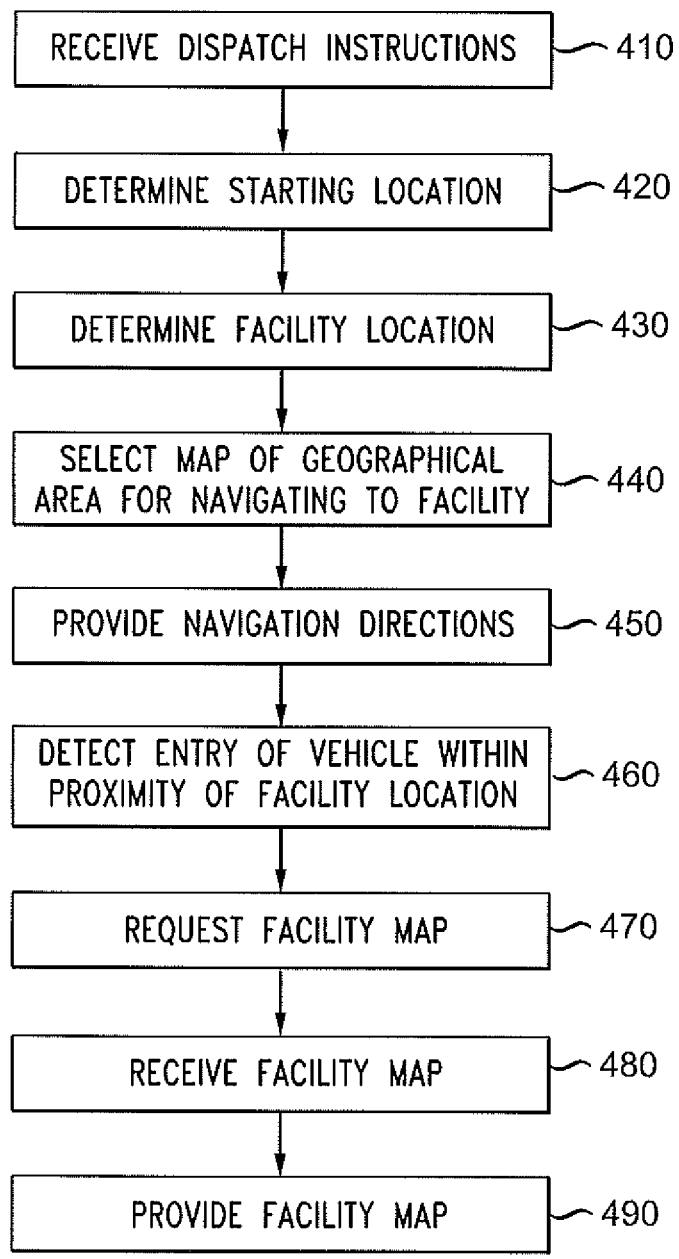

METHOD, SYSTEM, AND COMPUTER PROGRAM PRODUCT FOR PROVIDING A FACILITY MAP

TECHNICAL FIELD

The present disclosure relates generally to telecommunications, and, more particularly, to providing a facility map via a telecommunication network.

BACKGROUND

Mobile assets, such as vehicles and equipment within vehicles, pose challenges in terms of tracking, management and deployment. Currently, there are several techniques for tracking the locations of vehicles using, for example, a Global Positioning System (GPS) application. Typically, such systems are limited with regard to the information that they provide.

GPS systems and other location-determining systems do not provide information about facilities, such as public utility companies and telecommunication companies, other than geographical information. Facility map information reflecting the attributes of a facility, e.g., the location of cable lines, power lines, gas lines, etc., is important for a technician dispatched to a facility. Currently, facility maps provided by public utility companies and telecommunication companies are manually downloaded by a technician or provided to the technician in paper form. Downloading a facility map takes a long time.

Whether downloaded or in paper form, facility maps are often out of date. This poses challenges, particularly in emergency situations, in which attributes of a facility may change quickly.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the claims.

According to an exemplary embodiment, a method for providing a map of a facility includes receiving, via a communication device within a mobile device, dispatch instructions for dispatching the mobile device from a starting location to the facility at a destination within a geographical area. The method further includes detecting a current location of the mobile device as the mobile device moves from the starting location towards the destination. The map of the facility is received, via the communication device, based on the dispatch instructions and the current location of the mobile device, and the map of the facility is provided.

According to another embodiment, a device for providing detailed information regarding a facility includes a memory for storing dispatch instructions for dispatching a mobile device from a starting location to the facility at a destination within a geographical area. The device also includes a processor, coupled to the memory, for detecting a current location of the mobile device as the mobile device moves from the starting location towards the destination. The processor receives the map of the facility based on the dispatch instructions and the current location of the mobile device and provides the map of the facility.

According to another embodiment, a computer program product includes a computer readable medium having recorded thereon instructions that, when executed by a processor, provide a map of a facility. The instructions, when executed by the processor, receive dispatch instructions for dispatching a mobile device from a starting location to the facility at a destination within a geographical area, detect a current location of the mobile device as the mobile device moves from the starting location towards the destination, receive the map of the facility based on the dispatch instructions and the current location, and provide the map of the facility.

BRIEF DESCRIPTION OF THE DRAWINGS

FIG. 4 is a flow chart illustrating a method for providing a facility map according to an exemplary embodiment.

DETAILED DESCRIPTION

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

According to exemplary embodiments, a facility map reflecting attributes of a facility, such as a utility company, may be provided quickly and efficiently. The facility map may be an electronic representation of the geographic location, type, and attributes of a facility. Facility maps may be supplied by various facilities, e.g., gas companies, power companies, water companies, telecommunication companies, etc., and may indicate the geographic location of features of the facility lines (e.g., pipes, cables, etc.) owned and/or operated by the facility owner. A facility map may include attributes associated with one or more facility owners. For example, a facility map may indicate power lines owned by a power facility and fiber optic cables owned by a telecommunication company. Details of an exemplary facility map are provided with reference to FIG. 3 below.

Utilizing cloud based technology, facility maps for facilities of various telecommunication companies and public utility companies may be stored remotely, thus reducing memory requirements of devices to which the facility maps are provided. The cloud based technology also enables the facility maps to be easily updated and integrated. Facility maps may be shared between utility companies and other entities, e.g., government emergency response entities, such as police and fire departments. This may be particularly important during an emergency, e.g., for conducting disaster recovery. For example, in an area damaged by a tornado or a hurricane, a power company may update its facility maps to include warning notifications indicating potentially hazardous areas, e.g., damaged power lines. This may be shared with the telecommunication, gas, and water companies,.

Such information may be relayed to technicians in the field via a facility map. This provides a safer work environment for the technician and speeds the recovery work during emergency situations.

Figure 1:
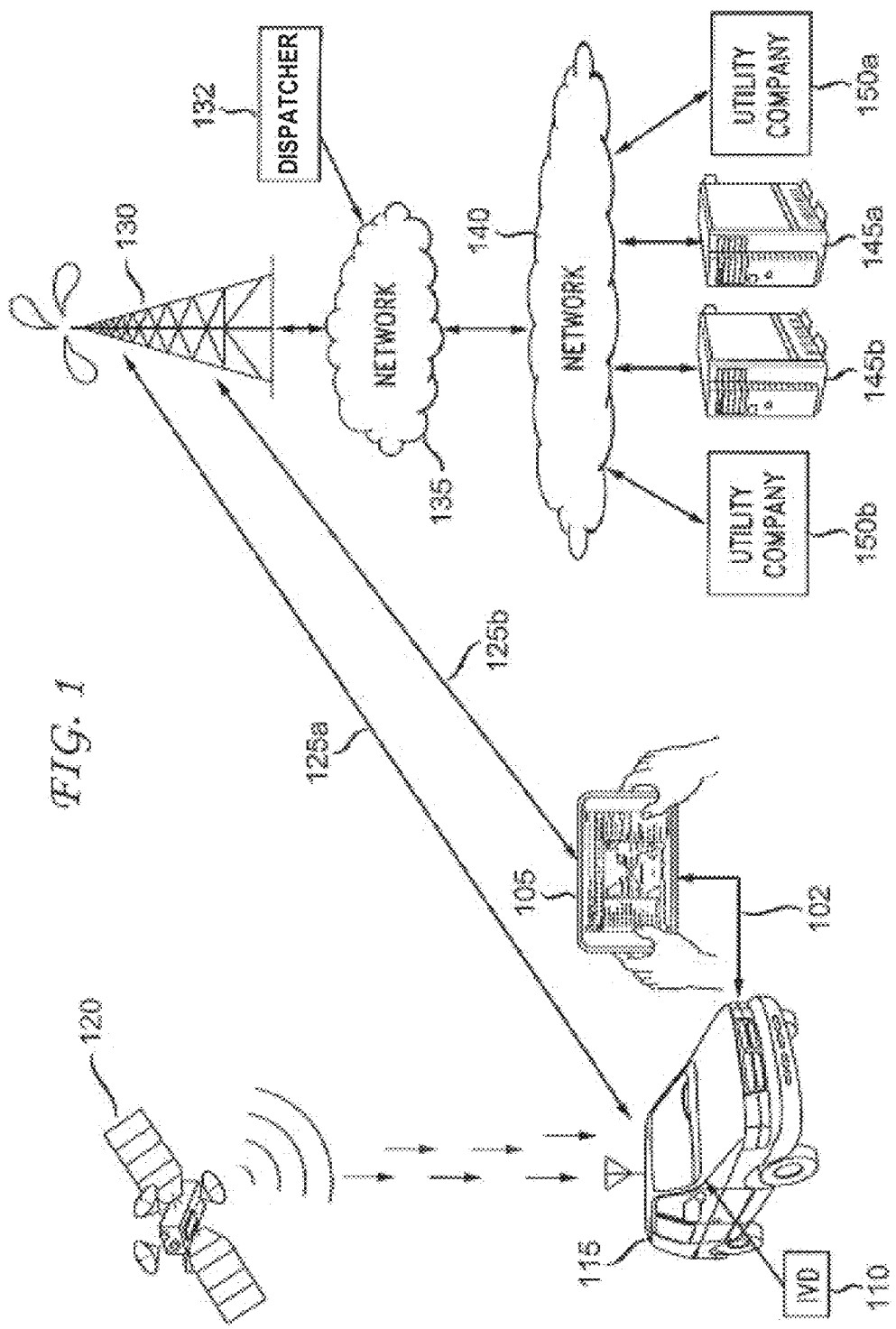
FIG. 1 illustrates an exemplary environment in which a facility map may be provided according to an exemplary embodiment.

FIG. 1 illustrates an exemplary environment in which a facility map may be provided according to an exemplary embodiment. As shown in FIG. 1, a communication device, referred to herein as an intelligent vehicle device (IVD) 110, may be installed in a mobile device, such as a vehicle 115 operated by a technician. It should be appreciated that the communication device may also be worn or carried, e.g., by a technician. The IVD 110 may be in communication with one or more personal mobile communication devices 105 of the technician via, e.g., a local ad-hoc WIFI connection 102. The IVD 110 is also in communication with a GPS system including GPS antennas 120 for receiving vehicle location data.

Although GPS is referred to herein as the system for providing location data, other alternatives for location tracking may be used, including cellular network triangulation signaling, short range beacon signaling, and/or combinations thereof, and the like. These alternatives may be useful when GPS service is unavailable. In such cases, signals from cell sites serving the personal mobile communication device 105 of the technician and/or the IVD 110 may be used to determine a current location of the vehicle 115.

The IVD 110 and the personal mobile communication device 105 are in communication with a cellular network 135 (including a base station 130) via wireless links 125a and 125b, respectively. According to one embodiment, a dispatcher 132 sends dispatch instructions to the personal mobile communication device 105 via the cellular network 135, and the personal mobile communication device 105 relays the dispatch instructions to the IVD 110 via, e.g., the WIFI link 102. According to another embodiment, the IVD 110 receives the dispatch instructions directly from the dispatcher 132 via the cellular network 135. The dispatch instructions include the location of a facility to which the vehicle 115 is to be dispatched. The location may be represented in the form of GPS coordinates. The dispatch instructions also include a work order indicating work to be performed by a technician at the facility. The IVD 110 analyses the dispatch instructions and retrieves a map of the geographical area covering the starting location of the vehicle 115 and the location of the facility. The map of the geographical area may be retrieved from a set of maps stored within a memory of the IVD 110, as described in more detail below with reference to FIG. 2. The IVD 110 also retrieves or generates instructions for navigating from the starting location to the destination location of the facility. According to an exemplary embodiment, the instructions are provided, turn-by-turn, via an audible speaker, thus relieving the technician from being distracted from driving by having to look at a screen or visual map.

The IVD 110 is also in communication with the facility map servers 145 (including facility map servers 145a and 145b shown in FIG. 1) via the cellular network 135 and a cloud network 140. The facility map servers 145 contain facility maps provided by the various utility companies 150 (including utility companies 150a and 150b shown in FIG. 1).

According to an exemplary embodiment, the cellular network 135, including the base station 130, may be implemented with one or more wireless networks that use exemplary telecommunications standards, such as Global System for Mobile communications (GSM) and Universal Mobile Telecommunications Systems (UMTS). It should be understood, however, that the embodiments may be implemented in wireless networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers. The cloud network 140 may include, e.g., a Wide Area Network (WAN), a public data network (PDN), the Internet, etc.

Although depicted as distinct networks, it should be appreciated that the networks 135 and 140 may be considered a single network. Also, it should be appreciated that that IVD 110 may be in contact with the cloud network 140 via another connection, e.g., a WIFI connection.

According to an exemplary embodiment, when the vehicle 115 arrives within a proximity of the location of the facility, the current location of the vehicle may be provided to one or more facility map servers 145. The location of the vehicle may be included as GPS coordinates within a request from the IVD 110. The request may also include details of the dispatch instructions. In response to the request, the facility map server(s) 145 pushes a map of the facility (or facilities) at the vehicle location to the IVD 110 via the cloud network 140 and the cellular network 135. For example, if the facility is an office building, and the dispatch instructions indicate that work needs to be done to repair power lines, the facility map provided may indicate the location of power lines, highlighting damaged power lines. The IVD 110, in turn, provides the facility map to a technician, e.g., via the WIFI link 102 and the personal mobile communication device 105. Once the initial request for the facility map is received, updates to the facility map may be pushed automatically from the server(s) 145 to the IVD 110. The facility maps may be pushed at regular intervals, when updates are made to the maps, etc.

In addition to being shared with the technician, the facility map may be shared with others, e.g., various utility companies. The technician and others may provide information via the IVD 110, the cellular network 135 and the cloud network 140 to the facility map servers 145 to update the facility maps.

According to exemplary embodiments, in addition to providing a facility map, the IVD 110 serves as an integrated system for tracking and managing deployment of mobile assets. Technology formerly implemented in separate devices may be incorporated into the IVD 110, such as Intelligent Field Device (IFD) technology, radio frequency identification (RFID) technology, GPS technology, cellular communication technology and on board vehicle diagnostic (OBD) capabilities. The IVD 110 may be implemented via a PC based vehicle platform. The platform may be a semi-permanent architecture with a wireless smart "touch screen" enabling a technician to access various applications, e.g., an on board diagnostic application and dispatch and telephone diagnostic tools. Back-end systems, connected via the various networks described above, may have full access to receive and manage GPS, RFID, and OBD data for the vehicle 115, along with other similarly equipped vehicles. Details of the IVD 110 are provided with reference to FIG. 2 below.

While only one vehicle 115, one IVD 110, and one personal mobile communication device 105 are shown in FIG. 1 for simplicity of illustration, it should be appreciated that any number of vehicles, IVDs and personal mobile communication devices are contemplated. Also, it should be appreciated that any number of facility map servers 145 may be included.

Figure 2:
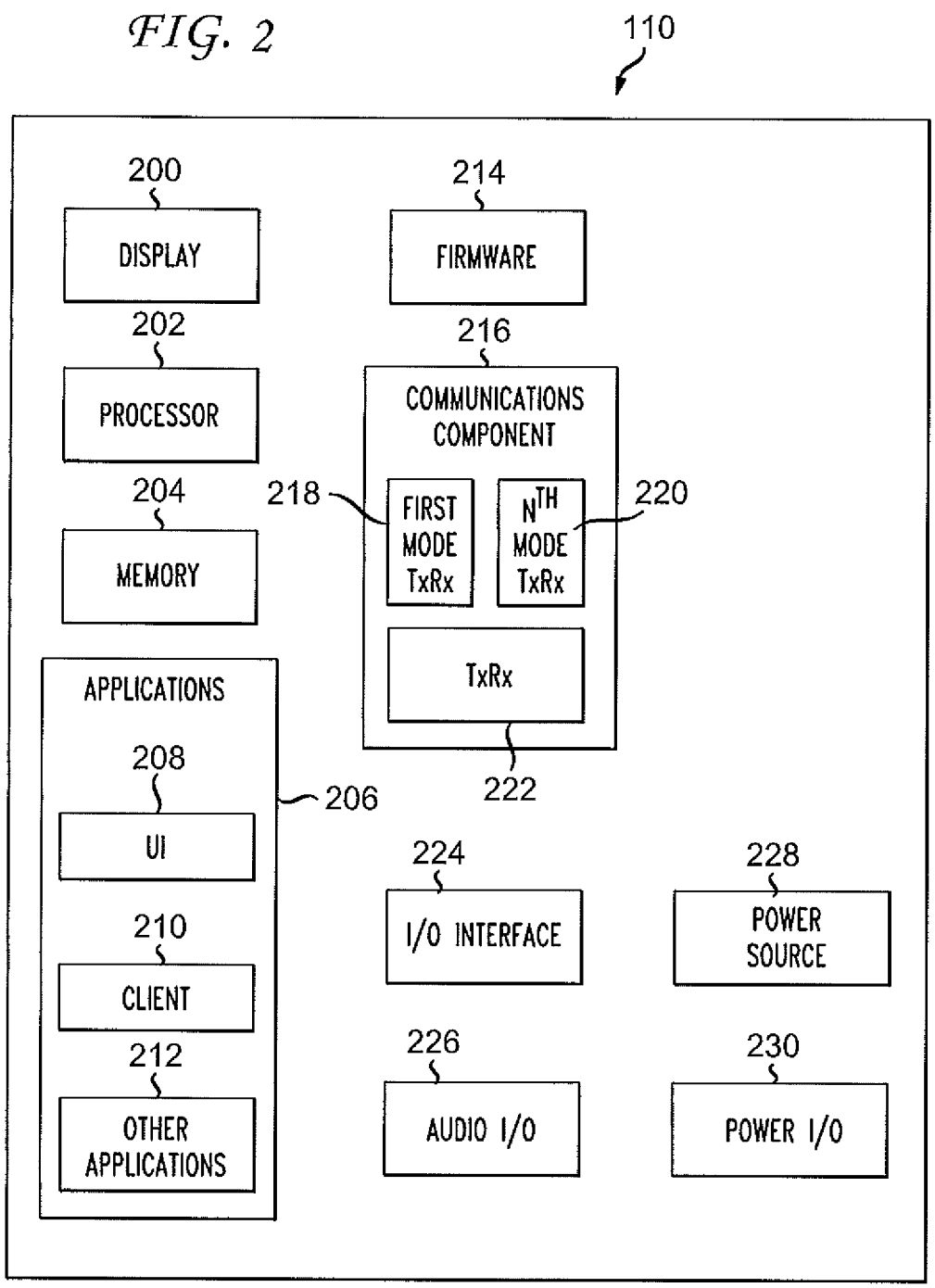
FIG. 2 illustrates a device for providing a facility map according to an exemplary embodiment.

FIG. 2 illustrates a schematic block diagram of an exemplary device for providing a facility map according to exemplary embodiments. Although no connections are shown between the components illustrated in FIG. 2, those skilled in the art will appreciate that the components can interact with each other via any suitable connections to carry out device functions.

It should be understood that FIG. 2 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software. The term "application", or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like.

Referring to FIG. 2, a device 110 may include a variety of computer-readable media, including volatile media, non-volatile media, removable media, and non-removable media. The term "computer-readable media" and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the device 110.

The device 110 may include a display 200, which may be a touchscreen display allowing a technician to access various applications. According to exemplary embodiment, the display 200 may display, e.g., vehicle diagnostic information, facility map information, geographical map data, inventory data, etc.

The device 110 may include a processor 202 for controlling and/or processing data. A memory 204 may interface with the processor 202 for the storage of data and/or applications 206.

The applications 206 may include a user interface (UI) application 208. The UI application 208 can interact with a client application 210 (e.g., an operating system) to facilitate user interaction with device functionality and data, for example, password entry and settings, configuring settings, and the like. Such user interaction may be facilitated via, e.g., a keypad or a touchscreen (e.g., the display 200) included in the device 110 or communicating with the device via the I/O interface 224.

The applications 206 may include other applications 212, such as, for example, applications for determining a location of the vehicle 115 based, e.g., on GPS coordinates, analyzing dispatch instructions, selecting a geographical area map, providing audible instructions for navigating, requesting a facility map, providing a facility map, etc. The applications 206 may further include applications for tracking and managing mobile assets, including the vehicle 115, the technician, and inventory carried by the vehicle 115, and sensing and providing diagnostic data, e.g., vehicle performance data.

The applications 206 can be stored in the memory 204 and/or in firmware components 214 and can be executed by the processor 202. The firmware 214 can also store code for execution during initialization of the device 110.

A communications component 216 may interface with the processor 202 to facilitate wired/wireless communication with external systems including, for example, the cellular networks 135, the GPS antennas 120, the cloud network 140, VoIP networks, local area networks (LAN's), wide area networks (WAN's), metropolitan area networks (MAN's), personal area networks (PAN's), and other networks, which may be implemented using WIFI, WIMAX, combinations and improvements thereof, and the like. The communications component 216 can also include a multimode communication subsystem for providing cellular communications via different cellular technologies. For example, a first cellular transceiver 218 can operate in one mode, for example, GSM, and an Nth transceiver 220 can operate in a different mode, for example UMTS. While only two transceivers 218, 220 are illustrated, it should be appreciated that a plurality of transceivers may be included. The communications component 216 may also include a transceiver 222 for other communication technologies, such as, for example, WIFI, WIMAX, BLUETOOTH, infrared, IRDA, NFC, RF, RFID, and the like. The communications component 216 may also facilitate reception from sensors within and external to the vehicle for on-board diagnostics according to, e.g., the On Board Diagnostics II (OBDII) standard. The communications component 216 may also facilitate reception from terrestrial radio networks, digital satellite radio networks, Internet based radio service networks, combinations thereof, and the like. The communications component 216 can process data from a network, such as, for example, the networks 135 and 140, the Internet, a corporate network, a home broadband network, a WIFI hotspot, and the like via an ISP, DSL provider, or broadband provider. The communications component 216 can be used to transmit facility map requests to the facility map servers 145 and to receive facility maps from the facility map servers 145.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combinations thereof, and the like. It should be appreciated that the I/O interface 224 can be used for communication between the device 110 and a network or local device instead of, or in addition to, the communications component 216.

Audio capabilities may be provided by an audio I/O component 226 that may include a speaker for the output of audio signals and a microphone to collect audio signals.

The power source 228 may include, e.g., batteries and/or other power subsystems (AC or DC). The power source 228 can interface with an exemplary power system or charging equipment, e.g., the vehicle power source, via a power I/O component 230.

Although not illustrated in detail, the dispatcher 132 and servers 145 may be implemented with similar components as those described above with regard to FIG. 2, e.g., communications components, a memory, an I/O interface, applications, and a processor. Also, the personal communication device 105 may be implemented with similar components.

Figure 3:
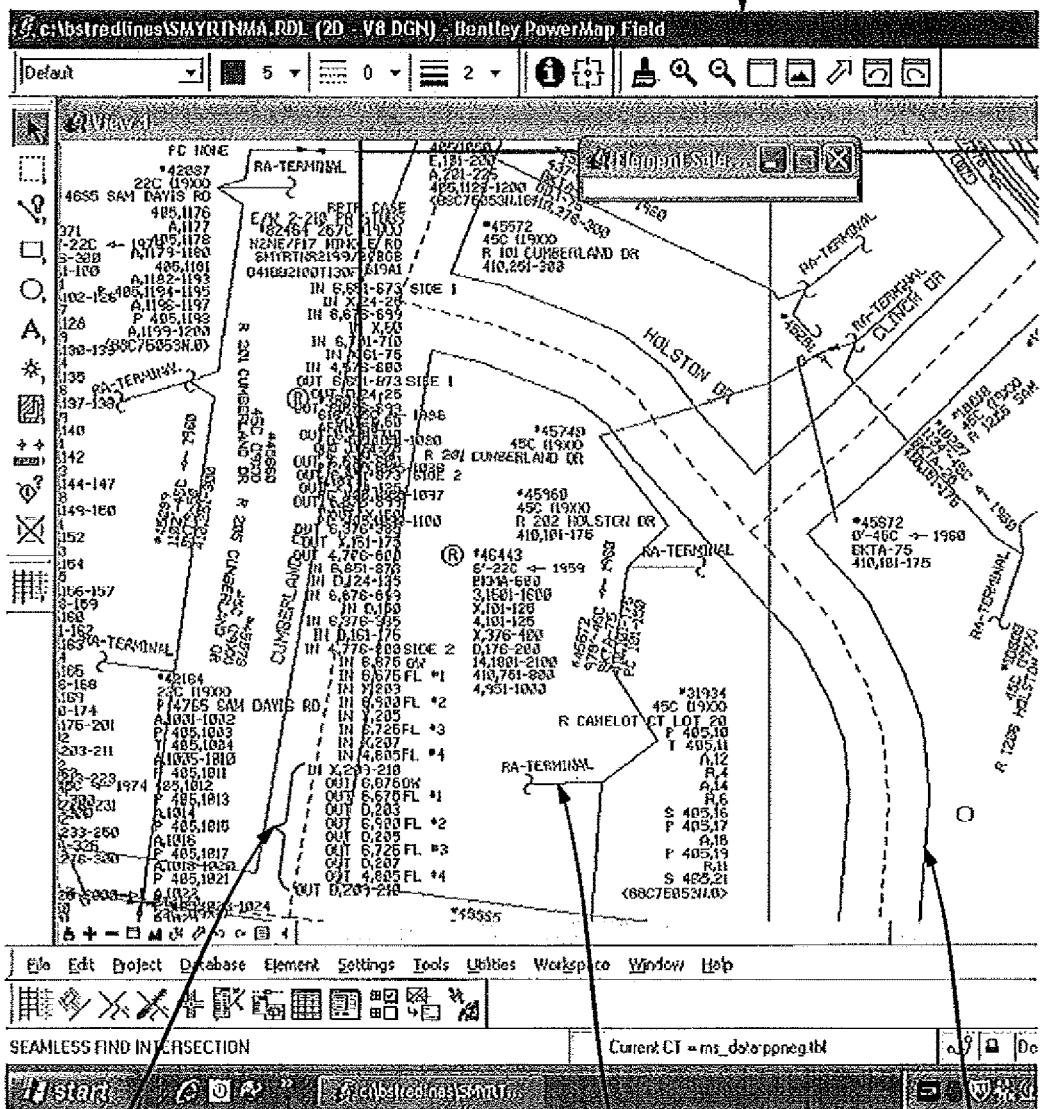
FIG. 3 illustrates an example of a facility map that may be provided according to an exemplary embodiment.

FIG. 3 illustrates an example of a facility map 300. According to an exemplary embodiment, a facility map may be provided in a variety of formats, including a geographic information system (GIS) format. In such a format, map features may be represented as shapes and/or lines, and the metadata that describes the geographical location and types of map features is associated with the map features. For example, a GIS formatted map may indicate a facility line using a wavy line. Landmarks and other features may be represented in GIS formatted facility maps, such as, e.g., utility poles, fire hydrants, architectural elements (e.g., building), traffic infrastructure elements (e.g., streets, intersections, etc.), cable input/outputs, cable pairs, manhole covers, etc. Examples of information provided by metadata may include, e.g., information about the geographic location of various points along a given line, the termination points of a given line, the types of facility lines, geographic locations of other features represented in the map (e.g., buildings, traffic infrastructure, etc.). The GIS map data and metadata is stored in the facility map servers 145 and may be updated by facility owners, technicians, utility companies 150, etc.

The example provided in FIG. 3 is a map of a power facility. The map shows cables, poles, terminals, anchors, and electronic facilities used by a technician, e.g., an outside plant engineer. These records allow the technician to track individual telephone lines and allow for records to be maintained of capital plant equipment (size of cable, date placed, whether it is aerial, buried, or underground). These records are also used by the repair organizations during outages and damaged facilities. Referring to FIG. 3, examples of items shown include remote access (RA) terminals, e.g., RA terminal 310, with respect to streets, e.g., street 330. The map also indicates the location of input and output cable pairs, e.g., 320. In FIG. 3, buried cable is represented by 45C, aerial cable is represented by 22C, and the inside of a building is referenced by 12C. Cable that runs through a conduit is represented by 4C.

FIG. 4 is a flow chart illustrating a process for providing a facility map according to one embodiment. At step 410, dispatch instructions are received, e.g., at the IVD 110. The dispatch instructions may be received from the dispatcher 132 via the cellular network 135 at the personal mobile communication device 105 of the technician and relayed via the WIFI link 102 to the IVD 110. Alternatively, or in addition, the dispatch instructions may be sent via the cellular network 135 to the IVD 110. The dispatch instructions are for dispatching the vehicle 115 or other mobile device including the IVD 110 from a starting location to the facility at a destination within a geographical area. The dispatch instructions may include not only the location of the facility destination but also a work order having instructions for the technician upon arrival at the destination. At step 420, the location of the vehicle 115 is determined by the IVD 110 based, e.g., on GPS signals from the GPS antennae 120. At step 430, the location of the facility is determined by the IVD 110 based on the dispatch instructions. At step 440, a map of the geographical area covering the starting location of the vehicle and the location of the destination of the facility is selected by the IVD 110, e.g., based on GPS coordinates of the current location and GPS coordinates of the destination. The map may be one of many stored in the IVD 110 in advance. The maps may be updated periodically or as desired. At step 450, directions for navigating to the destination of the facility from the starting location are provided by the IVD 110, e.g., audibly.

At step 460, entry of the vehicle 115 within a proximity of the destination of the facility is detected via the IVD 110, e.g., by comparison of a current location with the GPS coordinates of the facility location. The proximity may be variable and may depend upon the situation. For example, for a routine repair dispatch, the proximity may be within 10 yards or so from the destination of the facility. In an emergency situation, in which there may be dangers at the facility which the technician should be made aware of before arriving at the facility, the proximity may be a few blocks.

According to an exemplary embodiment, at step 470 a request for the facility map is relayed to the facility map server 145 from the IVD 110. According to one embodiment, the request may be relayed once the vehicle 115 is within the proximity to the facility location. In this embodiment, the request includes the current GPS coordinates of the vehicle. The dispatch instructions may also be relayed to the facility map server 145, e.g., from the dispatcher 132 or from the IVD 110 via the networks 135 and 140.

As an alternative to relaying a request to the facility map server 145 upon detection of the vehicle 115 within proximity of the location, it should be appreciated that the IVD 110 may relay a request to the facility map server 145, including the GPS coordinates of the facility location, at any time. In such a case, step 460 need not be performed.

At step 480, a map of the facility is received from the facility map server 145 via communication networks 135 and 140 at the IVD 110. The facility map is selected by the facility map server 145 based on the location of the vehicle at the time the request is received by the facility map server 145. The facility map may also be selected based on the dispatch instructions. Although not shown in the interest of simplicity, once the initial request for the facility map is made by the IVD 110, the facility map may be continually provided by the facility map server 145, as long as the vehicle 115 is within the proximity of the facility location, such that the facility map is updated as attributes of the facility change. At step 490, the IVD 110 provides the map of the facility, e.g., to the personal mobile communication device 105 of the technician. The facility map may be displayed on the technician's mobile communication device 105 and/or the IVD 110.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A system comprising:
 a processor; and a computer-readable medium storing instructions that, when executed by the processor, cause the processor to perform operations comprising receiving dispatch instructions comprising a work order associated with a facility and a location of the facility, the work order indicating work to be done on a feature of the facility, wherein the feature of the facility comprises at least one of power lines, telecommunication lines, or gas lines, determining, using at least one of a global positioning system, cellular network triangulation signaling, or short range beacon signaling, a first location of a vehicle associated with the system, determining, based on the dispatch instructions, the location of the facility, selecting, based on the first location of the vehicle associated with the system and the location of the facility, a map of a geographical area covering the first location of the vehicle associated with the system and the location of the facility for navigating the vehicle associated with the system to the facility, wherein the map of the geographical area is selected from a set of maps stored in the computer-readable medium of the system, detecting that the vehicle associated with the system is within a proximity of the location of the facility, in response to detecting that the vehicle associated with the system is within the proximity of the location of the facility, sending, via a communication network, to a facility map server, a request comprising a second location of the vehicle associated with the system within the proximity of the location of the facility and further comprising the dispatch instructions, and receiving, via the communication network, from the facility map server, in response to the request, a map of the facility indicating a location of the feature of the facility associated with the work order of the dispatch instructions sent to the facility map server.

2. The system of claim 1, wherein the dispatch instructions are received from a dispatcher via a mobile communication device.

3. The system of claim 1, wherein the dispatch instructions are received from a dispatcher.

4. The system of claim 3, wherein the dispatch instructions are received from the dispatcher via the communication network.

5. The system of claim 1, wherein a damaged one of the at least one of the power lines, the telecommunication lines, or the gas lines is highlighted on the map of the facility.

6. The system of claim 1, wherein the operations further comprise receiving, via the communication network, from the facility map server, an update associated with the map of the facility.

7. The system of claim 1, wherein the operations further comprise receiving, via the communication network, from the facility map server, updates associated with the map of the facility while the vehicle associated with the system remains within the proximity of the location of the facility.

8. A method comprising:

receiving, by a system comprising a processor and a computer-readable medium, dispatch instructions comprising a work order associated with a facility and a location of the facility, the work order indicating work to be done on a feature of the facility, wherein the feature of the facility comprises at least one of power lines, telecommunication lines, or gas lines;

determining, by the system, using at least one of a global positioning system, cellular network triangulation signaling, or short range beacon signaling, a first location of a vehicle associated with the system;

determining, by the system, based on the dispatch instructions, the location of the facility, selecting, by the system, based on the first location of the vehicle associated with the system and the location of the facility, a map of a geographical area covering the first location of the vehicle associated with the system and the facility for navigating the vehicle associated with the system to the facility, wherein the map of the geographical area is selected from a set of maps stored in the computer-readable medium of the system;

detecting, by the system, that the vehicle associated with the system is within a proximity of the location of the facility;

in response to detecting that the vehicle associated with the system is within the proximity of the location of the facility, sending, by the system, via a communication network, to a facility map server, a request comprising a second location of the vehicle associated with the system within the proximity of the location of the facility and further comprising the dispatch instructions; and receiving, by the system, via the communication network, from the facility map server, in response to the request, a map of the facility indicating a location of the feature of the facility associated with the work order of the dispatch instructions sent to the facility map server.

9. The method of claim 8, wherein the dispatch instructions are received from a dispatcher via a mobile communication device.

10. The method of claim 8, wherein the dispatch instructions are received from a dispatcher.

11. The method of claim 10, wherein the dispatch instructions are received from the dispatcher via the communication network.

12. The method of claim 8, wherein a damaged one of the at least one of the power lines, the telecommunication lines, or the gas lines is highlighted on the map of the facility.

13. The method of claim 8, further comprising receiving, by the system, via the communication network, from the facility map server, an update associated with the map of the facility.

14. The method of claim 8, further comprising receiving, via the communication network, from the facility map server, updates associated with the map of the facility while the vehicle associated with the system remains within the proximity of the location of the facility.

15. A non-transitory computer-readable medium comprising instructions that, when executed by a processor of a system, cause the processor to execute operations comprising:

receiving dispatch instructions comprising a work order associated with a facility and a location of the facility, the work order indicating work to be done on a feature of the facility, wherein the feature of the facility comprises at least one of power lines, telecommunication lines, or gas lines;

determining, using at least one of a global positioning system, cellular network triangulation signaling, and short range beacon signaling, a first location of a vehicle associated with the system;

determining, based on the dispatch instructions, the location of the facility;

selecting, based on the first location of the vehicle associated with the system and the location of the facility a map of a geographical area covering the first location of the vehicle associated with the system and the location of the facility for navigating the vehicle associated with the system to the facility, wherein the map of the geographical area is selected from a set of maps stored in the non-transitory computer-readable medium;

detecting that the vehicle associated with the system is within a proximity of the location of the facility;

in response to detecting that the vehicle associated with the system is within the proximity of the location of the facility, sending, via a communication network, to a facility map server, a request comprising a second location of the vehicle associated with the system within the proximity of the location of the facility and further comprising the dispatch instructions; and receiving, via the communication network, from the facility map server, in response to the request, a map of the facility indicating a location of the feature of the facility associated with the work order of the dispatch instructions sent to the facility map server.

16. The non-transitory computer-readable medium of claim 15, wherein the dispatch instructions are received from a dispatcher via a mobile communication device.

17. The non-transitory computer-readable medium of claim 15, wherein the dispatch instructions are received from a dispatcher via the communication network.

18. The non-transitory computer-readable medium of claim 17, wherein a damaged one of the at least one of the power lines, the telecommunication lines, or the gas lines is highlighted on the map of the facility.

\* \* \* \* \*